March 28, 1961 M. E. SENSENBRENNER 2,976,640
FISHING DEVICES
Filed Dec. 12, 1955
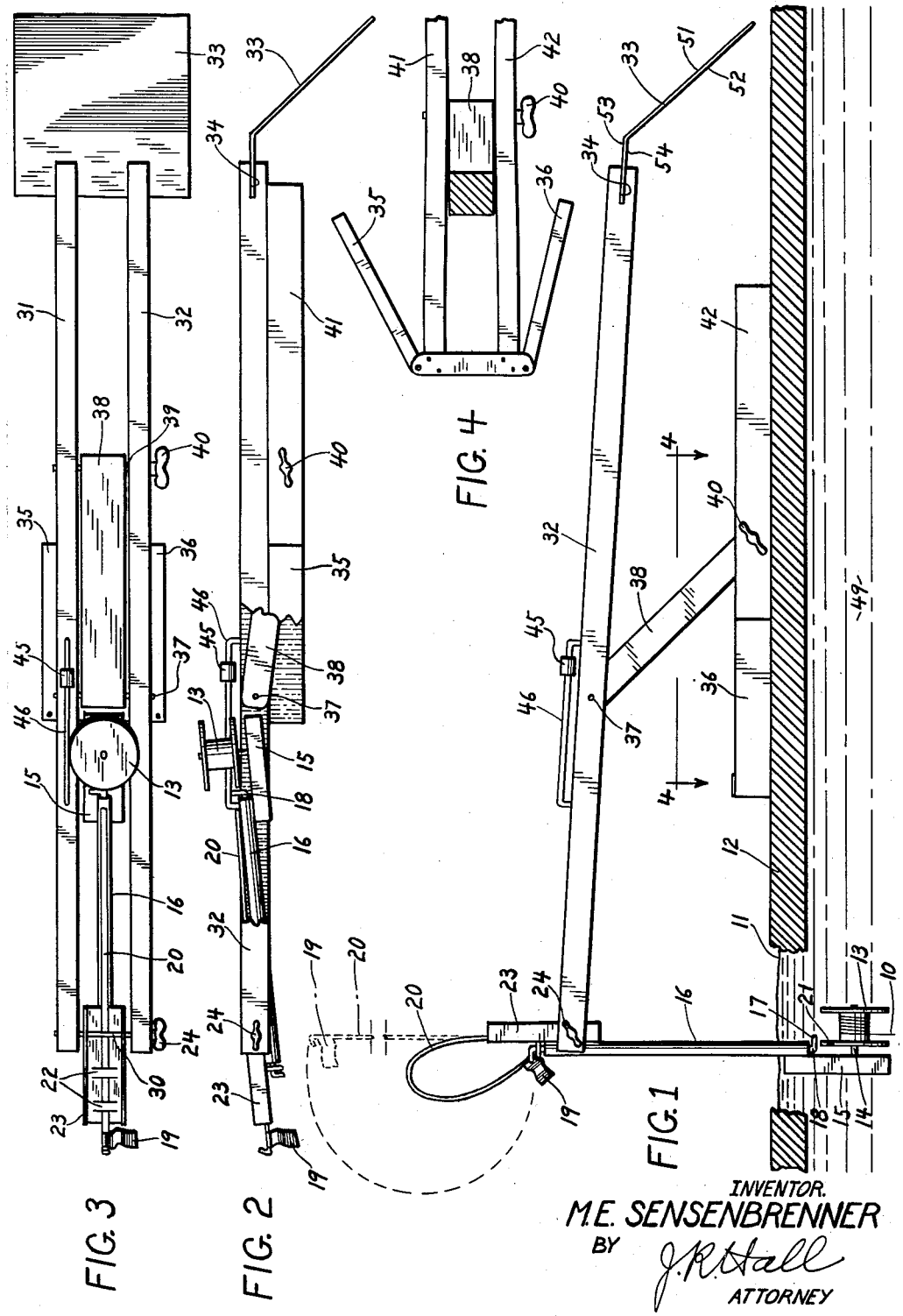
INVENTOR.
M.E. SENSENBRENNER
BY
J.R. Hall
ATTORNEY

2,976,640

FISHING DEVICES

Michael E. Sensenbrenner, Wittenberg, Wis.

Filed Dec. 12, 1955, Ser. No. 552,544

5 Claims. (Cl. 43—19.2)

This invention relates to fishing devices, and more particularly to ice-fishing devices.

An object of the invention is the provision of new and improved bobbing devices.

Another object of the invention is the provision of wind-actuated bobbing devices.

A still further object of the invention is the provision of bobbing devices including buoyant elements and wind biased elements acting in opposition to one another.

A device forming one embodiment of the invention may include a balanced rocking arm having on one end thereof a buoyant line-supporting member or tilt rod designed to bias the arm in one direction when partially immersed and a wind vane for pushing the rod in a direction opposite to that in which it is biased by the arm.

A complete understanding of the invention may be obtained from the following description of a bobbing device forming a specific embodiment thereof, when read in conjunction with the accompanying drawing, in which Fig. 1 is a side elevation of a fishing device forming one embodiment of the invention;

Fig. 2 is a side elevation of the device shown in Fig. 1 with elements thereof folded;

Fig. 3 is a top plan view of the device shown in Fig. 1 with the parts thereof folded, and Fig. 4 is a fragmentary top plan view of the device shown in Fig. 1.

Referring now in detail to the drawing, there is shown therein a device for bobbing or jigging a fishline in the water by the action of variations in wind, and is particularly adapted to ice-fishing as illustrated in Fig. 1, in which the device is supporting a line 10 having a baited hook (not shown) below a hole 11 in ice 12. The device includes a spool 13 rotatable on a pin 14 fixed to a channel 15 rigidly secured to a rigid tube or bearing 16. The spool 13 holds a supply of the line 10 wound thereon, and normally is held against rotation by an end 17 of a latching rod or shaft 18 of a well known type holding down a signal or flag 19. When a fish is hooked and pulls on the line 10, the spool 13 is rotated and a cam 21 on the spool turns the shaft 18 to release the flag, the flag including a resilient strap 20 which elevates the flag and the strap being slidable in guides 22 punched out of a channel 23.

The channel 23 is freely rotatable on a rod 30 securing together ends of rocker arms 31 and 32 having an angled wind vane 33 secured in slots 34 in the other ends thereof. The arms 31 and 32 are freely pivotal on a rod 37 mounted on one end of a post 38. The post is pivotally mounted at its other end on a bolt 39 having a wing nut 40 on one end, which may be tightened to clamp the post rigidly in adjusted position between parallel base bars 41 and 42, which support the entire device on the ice 12. A weight 45 is held by friction on a U-shaped slide rod 46 secured to the arm 31 on opposite sides of the pin or rod 37 and may be slid manually along the rod but normally is held by friction against such movement.

In its operation, the post is raised from its folded position as shown in Figs. 2 and 3, and is clamped by the bars 41 and 42 in a more vertical position as shown in Fig. 1 to provide clearance for free rocking or pivoting action of the rocker arms 31 and 32, and also so that post 38 can be adjusted so that the lower end, of wind vane 33, will be stopped in its downward movement by the ice 12 at a point with spool 13 just below the water to prevent the line from freezing on the spool in freezing weather. The hook on the line 10 is baited, and the spool 13, the line, the bracket 15 and a portion of the rod 16 are immersed in water 49. The strap 20 is pulled up in the guides 22 and is latched by the rod 18. The weight 45 then is slid along rod 46 to offset the weight of different sinkers, hooks, baits etc. used with buoyant line supporting members, so that rocker arms 31 and 32 are balanced in a position with the lower end of the wind vane 33 nearly touching the ice 12. Also, the stabilizing arms 35 and 36 may be swung outward if necessary to secure the device from toppling. Then the device is set in a direction facing into the wind assuming the wind to be toward the right, as viewed in Fig. 1. As the wind increases acting on vane 33, it raises the vane end of the rocker arms 31 and 32 causing them to be turned counterclockwise as viewed in Fig. 1, thereby causing the line supporting member or rod or tube 16 (into which there is built a buoyant material or unit) to be pushed down into the water until a part of or all of its full swing is reached, which is when the faces 51 and 52 of the vane 33 become horizontal and wind action is decreased or reversed on the vane 33, and the buoyant line supporting member is pushed far enough into the water so that the buoyant force of the extra volume of water displaced stops its downward action, or when the device reaches a position in relation to the hole so that the arms 31 and 32 touch the ice or other material near rod 30 before this joint is submerged in the water (which can freeze in cold weather). Then as the wind decreases the added buoyant force on the line supporting member, pushes the rod or tube 16 upward and the rocker arms 31 and 32 swing in a clockwise direction, as viewed in Fig. 1 back to its position shown in Fig. 1.

This action causes the bait on the line 10 to be constantly or intermittently lifted and lowered down in the water, by wind and water actions and has excellent fish attracting action. Also, the movement of the rod or tube 16 up and down through the water (and a little sideways which is allowed for at pin pivot 37) breaks loose ice tending to form therearound at the surface of the water, thereby preventing freezing in of the tube or rod 16 and stopping the bobbing or jigging action.

This action is greatly facilitated by the rigidity of the tube or rod 16, the outside surface of which is smooth and can be greased with grease or other non-freezing lubricant.

The wind when acting on the fishing tip-up as shown in Fig. 1 will strike against the face 52 and slightly against the face 54 of the vane 33 causing the arms 31 and 32 to be rotated in a counterclockwise direction. As the arms rotate, a point will be reached when they become horizontal at which time the faces 53 and 54 will not be biasing the arm in any direction, and the wind will be striking only the face 52 to produce further counterclockwise rotation. Further rotation of the arms will bring the face 53 into the wind, the wind then striking the face 53 will tend to urge the arms to swing clockwise. However, since the face 52 is still receiving wind pressure and the arms have by this time gained momentum, they may still continue to rotate counterclockwise.

If the arms continue to rotate still further in a counterclockwise direction, a point will be reached when faces 51 and 52 become horizontal, after which time all wind action on the vane 33 will be biasing the arms to swing clockwise. It becomes apparent therefor, that the further the arms rotate counterclockwise the less wind force there is to continue rotation in that direction, and the greater becomes the wind force to change the direction of rotation to clockwise.

Thus, it can be seen that the direction and intensity with which the vane 33 biases the arms 31 and 32 varies in such a manner as to always urge the arms in the desired direction from their given position. Also, the bracket 15 and the spool 13 create a drag through the water to damp rapid oscillatory movement and create highly efficacious bait action. In the buoyant line supporting member, buoyant material, such as cork, for example, is built in the spool 13, but can be in the channel 15 or anywhere on the lower end of the line supporting member. The channels 15 and 23 are mounted on opposite sides of the rod or tube 16 so that the pin pivot 30 comes directly over the spool 13 so when it is pushed down into the water it goes down in a vertical position. The wing nut 40 may be tightened after folding the elements to the positions shown in Figs. 2 and 3 to lock the elements in folded positions, in which the rod 16 is swung approximately 270° from its operative position and can also be locked with wing nut 24 at the pin 30. Also, the strap 20 is slid through the guides 22 back along the rod or tube 16 until only the flag 19 projects beyond the bracket 23. Thus, the device occupies a minimum of space for its transportation.

While the device has been described in use for ice fishing, it is obvious that it can also be used very successfully for warm weather fishing from banks, piers or boats. Of, if desired, it may be mounted on a float.

It is obvious that numerous changes may be made in the above-described device without departing from the spirit and scope of the invention as defined by the claims.

What is claimed is:

1. A fishing device, which comprises a pair of parallel base bars, a post, bolt means mounting the lower end of the post between the bars and actuatable to clamp the post therebetween in a position extending upwardly therefrom, a pair of rocker arms bracketing the upper end of the post, means mounting the intermediate portion of the arms pivotally on the post, a plunger member, bolt means securing the plunger member at one end of the arms between the arms in such a manner that the plunger member may depend into the water from the arms, and a wind vane secured to the other ends of the arms, the vane and the arms and the plunger member being of such relative weights and the position of the means mounting the arms on the post being such that in the absence of wind the arms are normally in a normal position in which a predetermined portion of the plunger member is immersed in the water, whereby in the presence of wind the vane moves the arms from said normal positions and to vary the portion of the plunger which is immersed in the water and the effect of the plunger is to tend to return the arms to said normal positions.

2. A fishing device, which comprises an arm means mounting said arm pivotally at a point thereon intermediate its ends, a rigid member pivotally secured to one end of said arm and depending downward into the water, said member containing a submerged float which acts continually to lift said member with constant force, a wind biased vane mounted on the other end of the arm which acts to lower said member in opposition to the action of said submerged float, the combination of these two actions causing said member to be raised and lowered in the water.

3. A fishing device, which comprises an arm means mounting the arm pivotally at a point thereon intermediate its ends, a rigid member thrust transmitting means securing said member to one end of said arm in a position in which said member depends downwardly into the water, said member being urged upward by the buoyant effect of the water with an intensity which varies with the amount of said member which is submerged, a wind biased vane mounted on the other end of the arm which urges the said member downward in opposition to the said buoyant effect, the static balance of the arm and the member and the vane being such relative to said point on the arm that the arm tends in the absence of wind to assume a normal position in which a predetermined portion of the member is immersed in water and in the presence of wind the vane tends to move the arm in accordance with the wind pressure thereon toward another position in which the member is immersed in the water to a different extent, and a fishing rig supported by the member.

4. A fishing device, which comprises a base designed to rest on ice or water, a rocker arm, post means secured at one end thereof to the base and extending upwardly therefrom and supporting the rocker arm above the base and secured pivotally to the rocker arm between the ends of the arm, a rigid line-supporting member, thrust transmitting means securing one end of the member to one end of the rocker arm in a position in which the member extends generally downwardly from the arm and into the water, and a wind vane secured to the other end of the arm for lifting that end of the arm when struck by wind, the elements supported by the ends of the arm being of such relative weights and the arm being secured pivotally to the post at a point such that the vane end of the arm is down when there is little wind and is lifted by greater wind on the vane to cause the line-supporting member to be pushed farther into the water.

5. A fishing device, which comprises a support, post means secured to the support at the lower end of the post means and extending upwardly from the support, an arm mounted pivotally intermediate the ends thereof on the upper end of the post means, a plunger member, means securing the plunger member to one end of the arm in a position in which the plunger member extends downwardly from said one end of the arm into the water and adapted to push the plunger member farther into the water when said one end of the arm is moved downwardly toward the water, wind responsive means secured to the other end of the arm for pivoting the arm on the post means, the plunger member and the arm and the wind responsive means being so constructed and arranged that in the absence of wind the arm assumes a normal position in which only a predetermined portion of the plunger means is immersed in the water and in the presence of wind the wind responsive means moves the arm from said normal position and vary the immersed portion of the plunger member, whereby the plunger member will tend to return the arm to its normal position, and a fishing line supported by said one end of the plunger and depending into the water.

References Cited in the file of this patent

UNITED STATES PATENTS

| 2,122,841 | Laurila | July 5, 1938 |
| 2,470,610 | Elsemore | May 17, 1949 |
| 2,612,712 | Kruze | Oct. 7, 1952 |
| 2,663,962 | King | Dec. 29, 1953 |
| 2,732,649 | Tuttle | June 4, 1956 |